US011421934B2

(12) United States Patent
Song et al.

(10) Patent No.: US 11,421,934 B2
(45) Date of Patent: Aug. 23, 2022

(54) REFRIGERATOR AND METHOD OF CONTROLLING A REFRIGERATOR

(71) Applicant: LG ELECTRONICS INC., Seoul (KR)

(72) Inventors: Youngseung Song, Seoul (KR); Namgi Lee, Seoul (KR); Namsoo Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 841 days.

(21) Appl. No.: 16/175,000

(22) Filed: Oct. 30, 2018

(65) Prior Publication Data

US 2019/0128598 A1 May 2, 2019

(30) Foreign Application Priority Data

Nov. 2, 2017 (KR) .......................... 10-2017-0145238

(51) Int. Cl.
*F25D 29/00* (2006.01)
*F25D 11/00* (2006.01)
(Continued)

(52) U.S. Cl.
CPC ............ *F25D 29/003* (2013.01); *F25C 5/187* (2013.01); *F25C 5/22* (2018.01); *F25D 11/022* (2013.01); *F25D 17/045* (2013.01); *F25D 17/062* (2013.01); *F25B 2600/112* (2013.01); *F25B 2600/2511* (2013.01); *F25C 2600/02* (2013.01);
(Continued)

(58) Field of Classification Search
CPC .... F25B 5/02; F25B 2600/2501; F25D 13/04; F25D 11/00; F25D 11/02; F25D 11/022; F25D 17/062; F25D 17/065; F25D 2700/02; F25D 2700/121; F25D 2700/122; F25D 2317/068; F25D 2317/0682; F25C 5/187

See application file for complete search history.

(56) References Cited

U.S. PATENT DOCUMENTS 4,459,812 A    7/1984  Norton
6,397,608 B1 * 6/2002  Sakuma .................... F25B 5/02
                                                    62/158
(Continued)

FOREIGN PATENT DOCUMENTS

CN    1435618    8/2003
CN    1566877    1/2005
(Continued)

OTHER PUBLICATIONS

Chinese Office Action dated May 29, 2020 issued in CN Application No. 201811295991.5.
(Continued)

*Primary Examiner* — Jianying C Atkinsson
*Assistant Examiner* — Erik Mendoza-Wilkenfel
(74) *Attorney, Agent, or Firm* — KED & Associates LLP

(57) ABSTRACT

A method for controlling a refrigerator includes determining whether an ice bin accommodated in an ice making compartment that receives cold air from the first storage compartment is full of stored ice, determining, by a controller, whether an algorithm that prevents the ice stored in the ice bin from melting needs to be performed upon determining that the ice bin is full, and performing the algorithm.

11 Claims, 6 Drawing Sheets

(51) Int. Cl.
 *F25C 5/00* (2018.01)
 *F25D 11/02* (2006.01)
 *F25D 17/04* (2006.01)
 *F25D 17/06* (2006.01)
 *F25C 5/187* (2018.01)
 *F25C 5/20* (2018.01)

(52) U.S. Cl.
 CPC .... *F25C 2700/02* (2013.01); *F25D 2317/061* (2013.01); *F25D 2317/0666* (2013.01); *F25D 2317/0681* (2013.01); *F25D 2600/02* (2013.01); *F25D 2700/16* (2013.01)

(56) References Cited

U.S. PATENT DOCUMENTS

| | | | |
|---|---|---|---|
| 8,171,744 | B2 | 5/2012 | Watson et al. |
| 9,689,600 | B2 | 6/2017 | Jeong et al. |
| 9,869,502 | B2 † | 1/2018 | Gardner |
| 2005/0076654 | A1* | 4/2005 | Chung .................. F25D 17/065 62/66 |
| 2008/0072610 | A1 † | 3/2008 | venkatakrishnan |
| 2008/0190125 | A1* | 8/2008 | Yoshioka .................. F25B 5/02 62/208 |
| 2010/0326093 | A1 | 12/2010 | Watson et al. |
| 2011/0000248 | A1* | 1/2011 | Jeong ...................... F25C 5/187 62/347 |
| 2011/0162392 | A1 | 7/2011 | Lim et al. |
| 2011/0302938 | A1* | 12/2011 | Lee ......................... F25D 29/00 62/89 |
| 2012/0222432 | A1 | 9/2012 | Lopes et al. |
| 2013/0098097 | A1* | 4/2013 | Lee ........................... F25C 1/00 62/340 |
| 2019/0093938 | A1* | 3/2019 | Miller ..................... F25D 23/04 |

FOREIGN PATENT DOCUMENTS

| | | |
|---|---|---|
| CN | 102213521 | 10/2011 |
| CN | 202066283 | 12/2011 |
| CN | 106839557 | 6/2017 |
| JP | 2000-266445 | 9/2000 |
| JP | 2003-121043 | 4/2003 |
| JP | 2003-322451 | 11/2003 |
| JP | 4059474 | 3/2008 |
| JP | 2017-062112 | 3/2017 |
| KR | 10-2003-0030961 | 4/2003 |
| KR | 10-2011-0136102 | 12/2011 |
| KR | 10-2012-0084095 | 7/2012 |
| KR | 10-2012-0092849 | 8/2012 |
| KR | 10-1576686 | 12/2015 |
| KR | 10-1650303 | 8/2016 |

OTHER PUBLICATIONS

European Search Report dated Mar. 13, 2019 issued in EP Application No. 18204019.6.
Korean Office Action dated Dec. 21, 2021 issued in Application 10-2017-0145238.
Korean Notice of Allowance dated Feb. 24, 2022 issued in KR Application No. 10-2017-0145238.

\* cited by examiner
† cited by third party

REFRIGERATOR AND METHOD OF CONTROLLING A REFRIGERATOR

CROSS-REFERENCE TO RELATED APPLICATION

This application claims priority under 35 U.S.C. § 119 to Korean Application No. 10-2017-0145238, filed on Nov. 2, 2017, whose entire disclosure is hereby incorporated by reference.

BACKGROUND

1. Field

A refrigerator and a method of controlling a refrigerator are disclosed herein.

2. Background

Refrigerators are home appliances that may store foods or other items at a low temperature. A storage compartment may always be maintained at a constant low temperature. In the case of household refrigerators, the storage compartment may be maintained at a temperature within upper and lower limit ranges on the basis of a set temperature.

The refrigerator may be controlled through a method in which when a temperature of the storage compartment increases to the upper limit temperature, a refrigeration cycle may operate to cool the storage compartment, and when the temperature of the storage compartment reaches the lower limit temperature, the refrigeration cycle may be stopped. Recently, refrigerators have been developed in which an evaporator is installed in each of a freezing compartment and a refrigerating compartment. Such a refrigerator may allow refrigerant to flow to one evaporator of a freezing compartment or a refrigerating compartment and then flow to the other evaporator.

A control method of such a refrigerator is disclosed in Korean Patent Registration No. 10-1576686 (Registered on Dec. 4, 2016) that is a related art document, the disclosure of which is hereby incorporated by reference in its entirety. In the control method of the refrigerator disclosed in the related art document, after a refrigerating compartment valve and a freezing compartment fan operate to cool the refrigerating compartment, a freezing compartment valve and a freezing compartment fan may operate to cool the freezing compartment.

After the cooling of the freezing compartment is completed, the compressor may be stopped. In this state, the freezing compartment fan may rotate to reduce a temperature of the freezing compartment by latent heat of evaporation. However, although the temperature of the freezing compartment decreases when the compressor is stopped, the temperature of the refrigerating compartment may not decrease.

Generally, the freshness of foods stored in the refrigerating compartment is higher as a variation in temperature of the refrigerating compartment is smaller. If the freshness of the foods is high, a storage period of the foods may increase.

However, in the case of the related art document, when the compressor is stopped, the temperature of the refrigerating compartment may continuously increase until the compressor operates again to cool the refrigerating compartment. When the compressor operates again, the temperature of the refrigerating compartment may decrease to increase a variation of the temperature. Thus, the freshness of the foods stored in the refrigerating compartment may be deteriorated.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
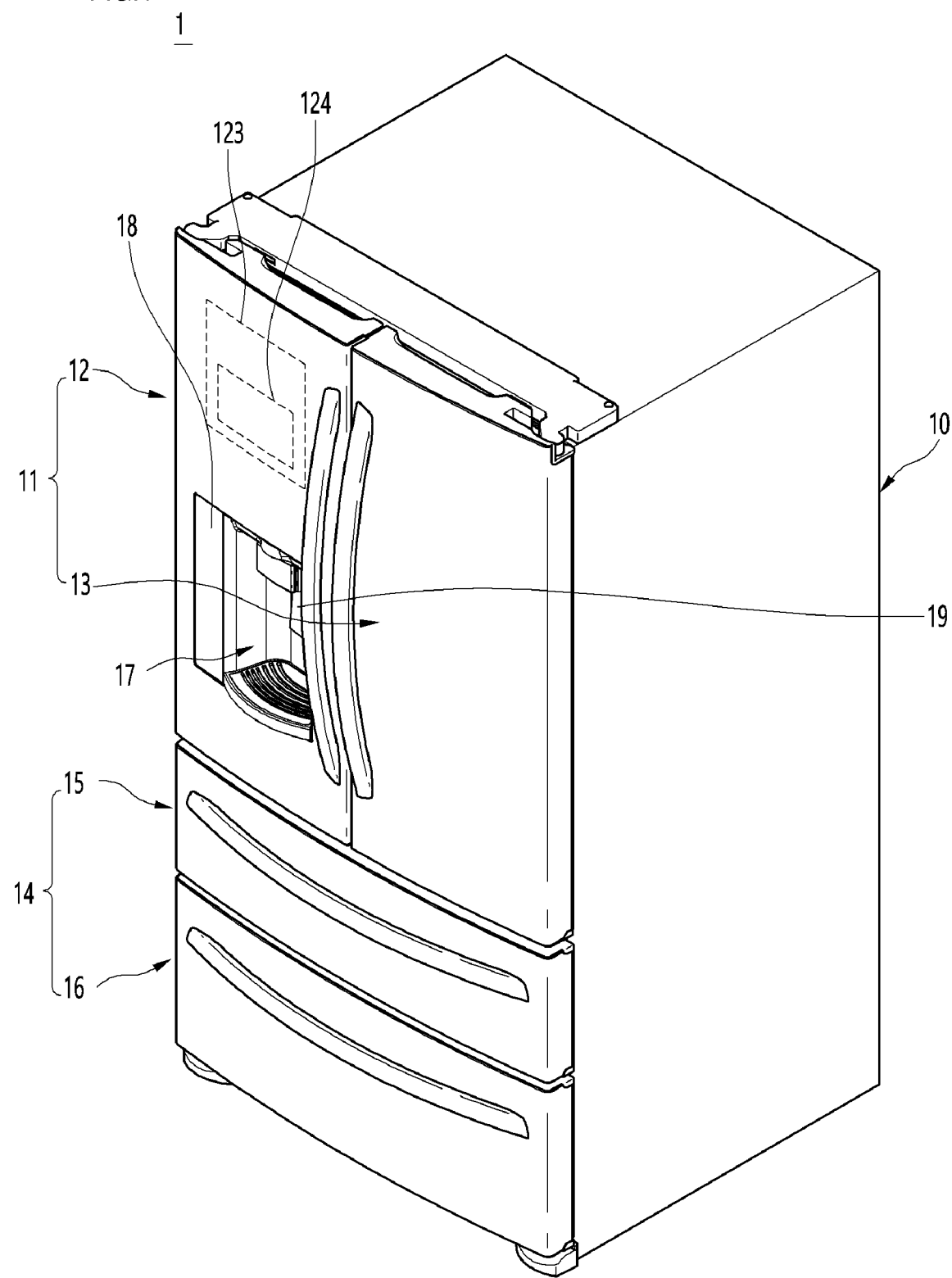
FIG. 1 is a perspective view of a refrigerator according to an embodiment.
Figure 2:
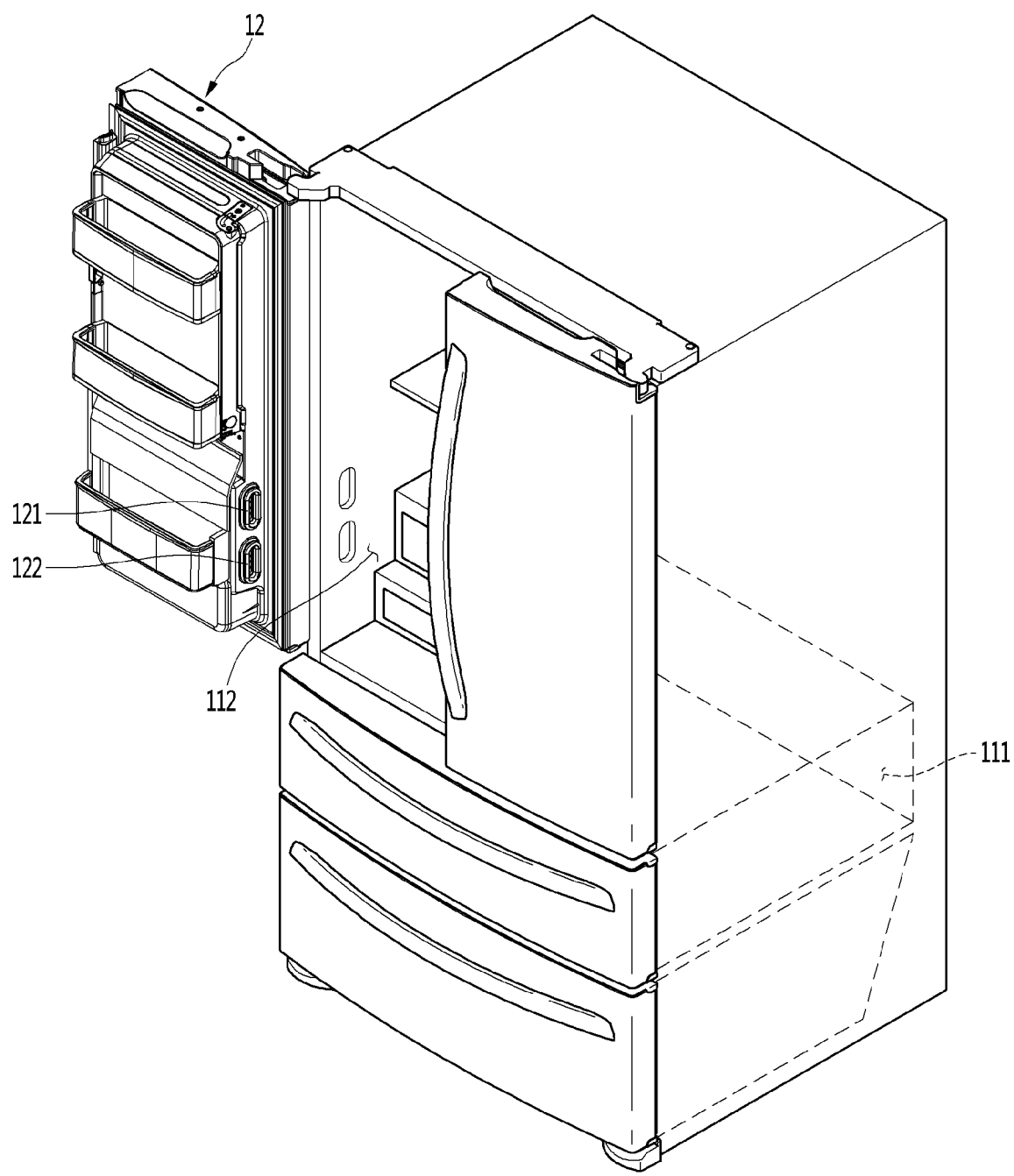
FIG. 2 is a perspective view of the refrigerator in a state in which some doors are opened according to the embodiment.
Figure 3:
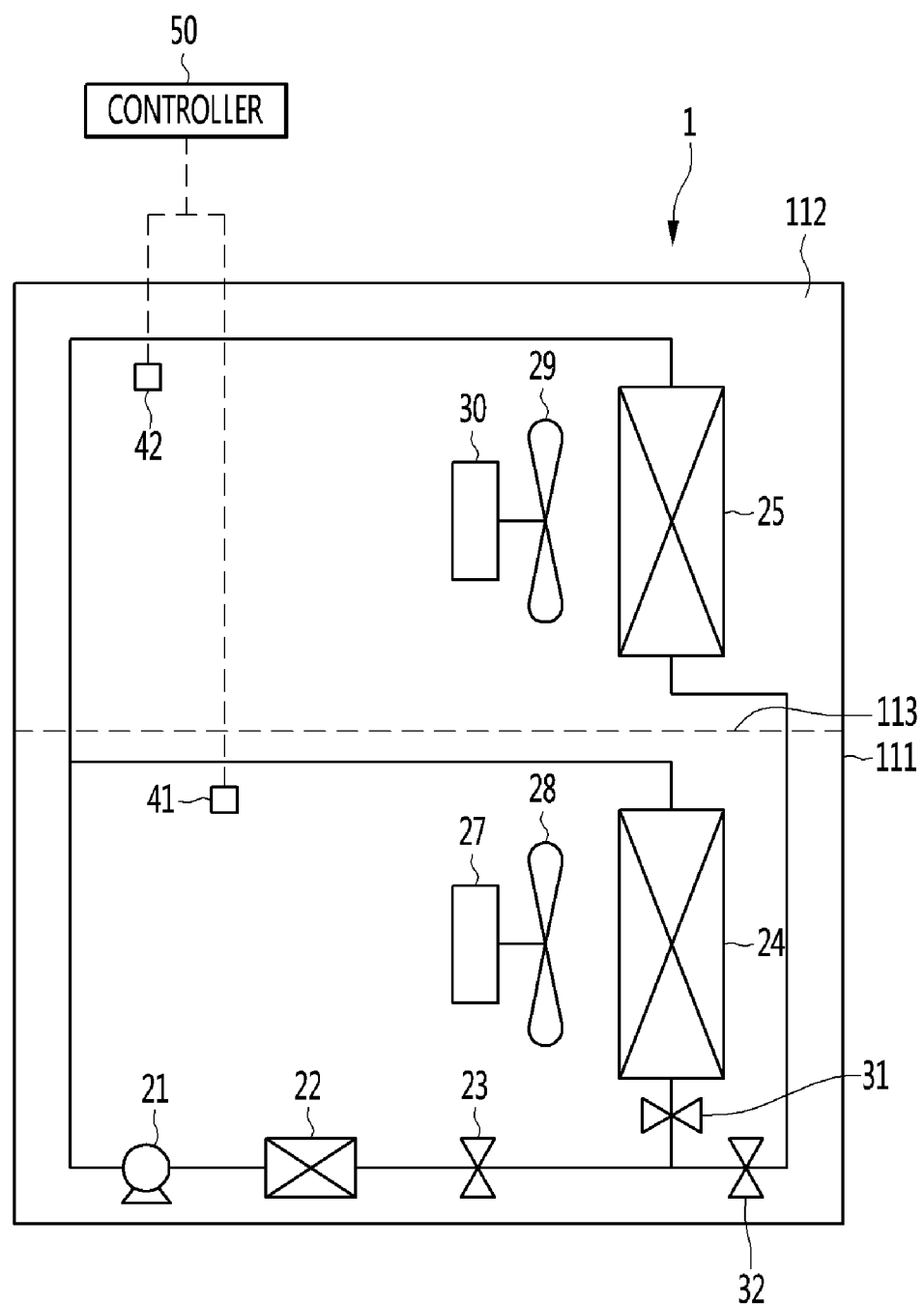
FIG. 3 is a schematic view showing the configuration of the refrigerator according to the embodiment.
Figure 4:
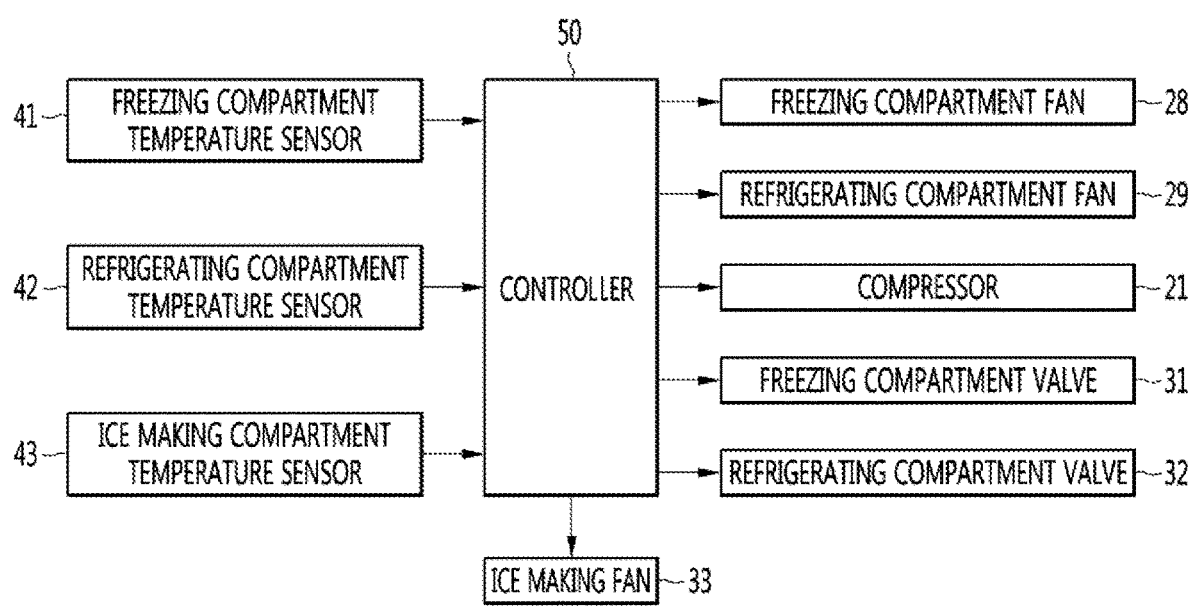
FIG. 4 is a block diagram of the refrigerator according to the embodiment.

Referring to FIGS. 1 to 4, the refrigerator 1 according to the embodiment may include a cabinet 10 that forms an appearance thereof and a plurality of doors 11 and 14 movably connected to the cabinet 10. A storage compartment in which food is stored may be formed in the cabinet 10. The storage compartment may include a refrigerating compartment 112 and a freezing compartment 111 located below the refrigerating compartment 112. The freezing compartment 111 and the refrigerating compartment 112 may be vertically partitioned by a partitioning wall 113 in the cabinet 10.

Although a bottom freeze type refrigerator in which a refrigerating compartment is placed above a freezing compartment is described in the present embodiment, the present embodiment is applicable to a refrigerator in which a refrigerating compartment is placed below a freezing compartment, a refrigerator having only a freezing compartment or a refrigerator in which a freezing compartment and a refrigerating compartment are placed from side to side.

The plurality of doors 11 and 14 may include at least one refrigerating compartment door 11 configured to open or close the refrigerating compartment 112 and at least one freezing compartment door 14 configured to open or close the freezing compartment 111. The at least one refrigerating compartment door 11 may include a plurality of refrigerator doors 12 and 13 provided laterally adjacent to each other. The plurality of refrigerator doors 12 and 13 may include a first refrigerating compartment door 12 and a second refrigerating compartment door 13 provided on a first or right side of the first refrigerating compartment door 12. The first refrigerating compartment door 12 and the second refrigerating compartment door 13 may move independently from each other.

The at least one freezing compartment door 14 may include a plurality of freezer doors 15 and 16 provided vertically adjacent to each other. The plurality of freezer doors 15 and 16 may include a first freezing compartment door 15 and a second freezing compartment door 16 located below the first freezing compartment door 15. The first and second refrigerating compartment doors 12 and 13 may rotate and the first and second freezing compartment doors 15 and 16 may slide. In another example, the first freezing compartment door 15 and the second freezing compartment door 16 may be arranged side-by-side and may rotate.

A dispenser 17 configured to dispense water and/or ice may be provided in any one of the first and second refrigerating compartment doors 12 and 13. FIG. 1 shows the dispenser 17 provided in the first refrigerating compartment door 12, for example. The dispenser 17 may alternatively be provided in any one of the freezing compartment doors 15 and 16.

An ice making compartment configured to store ice and an ice making assembly configured to make ice and accommodated in the ice making compartment may be provided in any one of the first and second refrigerating compartment doors 12 and 13. Alternatively, the ice making assembly may be provided in the freezing compartment 111. A cold air inlet 121 and a cold air outlet 122 may be formed in any one of the first and second refrigerating compartment doors 12 and 13.

The ice making assembly may include an ice maker and an ice bin configured to store ice made in the ice maker. The ice maker may receive cold air from the freezing compartment 11 and may make ice. The ice making assembly may be implemented by well-known technology and thus a detailed description thereof will be omitted.

The dispenser 17 and the ice making assembly may be provided in the first refrigerating compartment door 12 or the second refrigerating compartment door 13. Hereinafter, assume that the dispenser 17 and the ice making assembly are provided in the at least one refrigerating compartment door 11 including the first refrigerating compartment door 12 and the second refrigerating compartment door 13.

An input unit (or input) 18 to select the type of ice to be dispensed may be provided in the at least one refrigerating compartment door 11. In addition, the dispenser 17 may include an operation pad 19 configured to be operated by a user in order to dispense water or ice. Alternatively, a button or a touch panel may be provided in order to input a command to dispense water or ice.

The refrigerator 1 may further include a compressor 21, a condenser 22, an evaporator 24 for a freezing compartment (or referred to as a "first evaporator"), which may receive refrigerant from the compressor 21 to generate cold air to cool the freezing compartment 111, and an evaporator 25 for a refrigerating compartment (or referred to as a "second evaporator"), which may receive refrigerant from the compressor 21 to generate cold air to cool the refrigerating compartment 112. The refrigerator 1 may include a valve that allows the refrigerant passing through an expansion member 23 to flow to one of the evaporator 24 for the freezing compartment or the evaporator 25 for the refrigerating compartment.

The valve may selectively open any one of a first refrigerant passage connected between the compressor 21 and the evaporator 24 for the freezing compartment to allow refrigerant to flow therein and a second refrigerant passage connected between the compressor 21 and the evaporator 25 for the refrigerating compartment to allow refrigerant to flow therein. Accordingly, the refrigerating compartment 112 and the freezing compartment 111 may be alternately cooled.

The valve may include, for example, a freezing compartment valve 31 that controls a flow of the refrigerant to the evaporator 24 for the freezing compartment and a refrigerating compartment valve 32 that controls a flow of the refrigerant to evaporator 25 for the refrigerating compartment. When the freezing compartment valve 31 is turned on or opened, the first refrigerant passage may be opened such that the refrigerant flows to the evaporator 24 for the freezing compartment, and, when the freezing compartment valve 31 is turned off or closed, the first refrigerant passage may be closed to block a flow of the refrigerant to the evaporator 24 for the freezing compartment.

When the refrigerating compartment valve 32 is turned on or opened, the second refrigerant passage may be opened such that refrigerant flows to the evaporator 25 for the refrigerating compartment, and, when the refrigerating compartment valve 32 is turned off or closed, the second refrigerant passage may be closed to block a flow of the refrigerant to the evaporator 25 for the refrigerating compartment. In another example, the valve may include a single switching valve that controls a flow of the refrigerant. The single switching valve may be a three-way valve, for example.

At this time, the switching valve may be in a first state in which refrigerant flows to only the evaporator 24 for the freezing compartment, a second state in which refrigerant flows to only the evaporator 25 for the refrigerating compartment, a third state in which refrigerant flows to the evaporator 24 for the freezing compartment and the evaporator 25 for the refrigerating compartment, or a fourth state in which refrigerant is restricted from flowing to the evaporator 24 for the freezing compartment and the evaporator 25 for the refrigerating compartment. The refrigerator 1 may further include a freezing compartment fan 28 (referred to as a "first cooling fan") configured to supply air to the evaporator 24 for the freezing compartment, a first motor 27 configured to rotate the freezing compartment fan 28, a refrigerating compartment fan 29 (referred to as a "second cooling fan") configured to supply air to the evaporator 25 for the refrigerating compartment, and a second motor 30 configured to rotate the refrigerating compartment fan 29.

A series of cycles in which the refrigerant flows to a compressor 21, a condenser 22, an expansion member 23, and the evaporator 24 for the freezing compartment may be referred to as a "freezing cycle", and a series of cycles in which the refrigerant flows to the compressor 21, the condenser 22, the expansion member 23, and the evaporator 25 for the refrigerating compartment may be referred to as a "refrigerating cycle". The freezing compartment fan 28 may rotate during the freezing cycle operation, and the refrigerating compartment fan 29 may rotate during the refrigerating cycle operation. The compressor 21 may continuously operate during the operation of each of the freezing cycle and the refrigerating cycle.

Although one expansion member 23 is arranged at an upstream side of the single switching valve as described above, a first expansion member may be arranged between the single switching valve and the evaporator 24 for the freezing compartment, and a second expansion member may be arranged between the single switching valve and the evaporator 25 for the refrigerating compartment. During an operation of the refrigerating cycle, the refrigerating compartment valve 32 may be turned on or opened and the freezing compartment valve 31 may be turned off or closed. During an operation of the freezing cycle, the freezing compartment valve 31 may be turned on or opened and the refrigerating compartment valve 32 may be turned off or closed.

The refrigerator 1 may further include an ice making fan 33 configured to supply cold air from the freezing compartment 111 toward the ice making assembly. The ice making fan 33 may be located in a duct that guides cold air from the freezing compartment 111 toward the ice making assembly in the freezing compartment 111 or the cabinet 10, without being limited thereto. Then the freezing cycle operates, the ice making fan 33 and the freezing compartment fan 28 may simultaneously operate.

Before sensing the full ice state, the ice making fan 33 may rotate in order to supply cold air to an ice making compartment even when the refrigerating cycle operates. In this specification, the full ice state may refer to a state in which an ice bin 124 is full of ice and the full ice state may be sensed by a full ice sensor. Sensing of the full ice state may be implemented by a well-known technology and thus a detailed description will be omitted.

The refrigerator 1 may further include a freezing compartment temperature sensor 41 configured to sense a temperature of the freezing compartment 111, a refrigerating compartment temperature sensor 42 configured to sense a temperature of the refrigerating compartment 112, the input 18 that allows a user to input a set temperature (or a target temperature) of each of the freezing compartment 111 and the refrigerating compartment 112, and a control unit (or controller) 50 that controls the cooling cycle (including the freezing cycle and the refrigerating cycle) on the basis of the input set temperature and the temperatures sensed by the temperature sensors 41 and 42. The refrigerator 1 may further include an ice making compartment temperature sensor 43 configured to sense the temperature of the ice making compartment 123.

The controller 50 may control the freezing compartment valve 31 and the ice making fan 33 based on the state of the refrigerant cycle and/or the temperature of the ice making compartment sensed by the ice making compartment sensor 43, upon sensing the full ice state. In this specification, a temperature less than that set temperature of the freezing compartment 111 may be called a first freezing compartment reference temperature (or a lower limit temperature), and a temperature greater than the set temperature of the freezing compartment 111 may be called a second freezing compartment reference temperature (or an upper limit temperature). A range between the first freezing compartment reference temperature and the second freezing compartment reference temperature may be called a freezing compartment set temperature range.

Although not limited, the set temperature of the freezing compartment 111 may be a mean temperature of the first freezing compartment reference temperature and the second freezing compartment reference temperature. A temperature less than that set temperature of the refrigerating compartment 112 may be called a first refrigerating compartment reference temperature (or a lower limit temperature), and a temperature greater than the set temperature of the refrigerating compartment 112 may be called a second refrigerating compartment reference temperature (or an upper limit temperature). A range between the first refrigerating compartment reference temperature and the second refrigerating compartment reference temperature may be called a freezing compartment set temperature range.

Although not limited, the target temperature of the refrigerating compartment 112 may be a mean temperature of the first refrigerating compartment reference temperature and the second refrigerating compartment reference temperature. A user may set a set temperature of each of the freezing compartment 111 and the refrigerating compartment 112 through the input 18. The controller 50 may control the temperature of the refrigerating compartment 112 to be maintained within the set temperature range.

The controller 50 may operate the refrigerating cycle when the sensed temperature of the refrigerating compartment 112 is equal to or greater than the reference temperature of the second refrigerating compartment (satisfying a refrigerating cycle start condition), and the refrigerating cycle may be stopped when the sensed temperature of the refrigerating compartment 112 is equal to or below the first refrigerating compartment reference temperature (satisfying a refrigerating cycle start condition or a refrigerating cycle stop condition).

When the sensed temperature of the freezing compartment 111 is less than the first freezing compartment reference temperature when the temperature of the refrigerating compartment 112 is greater than the first refrigerating compartment reference temperature while the freezing cycle operates, the freezing cycle may be stopped (the freezing cycle stop condition is satisfied). The satisfaction of the start condition of the refrigerating cycle may take precedence over the satisfaction of the stop condition of the freezing cycle. This is because influence on the freshness of an object to be stored may be larger when the temperature change width of the refrigerating compartment is large, as compared to when the temperature change width of the freezing compartment is large. For example, when the start condition of the refrigerating cycle is satisfied before the stop condition of the freezing cycle is satisfied during the operation of the freezing cycle, the freezing cycle is stopped, and the refrigerating cycle may start.

In one embodiment, the basic refrigerant cycle for cooling the storage compartment may be performed in order of a refrigerating cycle, a freezing cycle, pump down, and compressor stop. For example, after the refrigerating cycle operates, the refrigerating cycle may be stopped and the freezing cycle may operate. When the stop condition of the freezing cycle is satisfied, pump down (operation of operating the compressor in a state of blocking supply of refrigerant to a plurality of evaporators and collecting the refrigerant left in the evaporators to the compressor) and compressor stop may be sequentially performed. The compressor 21 may be stopped during a predetermined time or until a specific condition is satisfied. For example, the specific condition may be the start condition of the refrigerating cycle.

In another embodiment, a basic refrigerant cycle that cools the storage compartment may be performed in order of a first refrigerating cycle, a freezing cycle, a second refrigerating cycle, pump down, and compressor stop. For example, after the first refrigerating cycle operates, the first refrigerating cycle may be stopped and the freezing cycle may operate. When the stop condition of the freezing cycle is satisfied, after the second refrigerating cycle operates, the compressor 21 may be stopped during a predetermined time or while a specific condition is satisfied.

In the present embodiment, the basic refrigerant cycle may be performed in order to stabilize the refrigerant cycle. During operation of the freezing cycle according to one embodiment, if the start condition of the refrigerating cycle is satisfied before the stop condition of the freezing cycle is satisfied, the first refrigerating cycle may restart instead of pump down. Thus, the refrigerant cycle may not be stable.

Alternatively, during operation of the freezing cycle according to another embodiment, if the start condition of the refrigerating cycle is satisfied before the stop condition of the freezing cycle is satisfied, the first refrigerating cycle may restart instead of the second refrigerating cycle. Thus, the refrigerant cycle may not be stable.

Referring to FIGS. 1 to 6, the refrigerator 1 may be powered on to operate (S1). When the refrigerator 1 is powered on, the refrigerator 1 may cool the freezing compartment 111 and/or the refrigerating compartment 112.

Since the temperatures of the refrigerating compartment 112 and the freezing compartment 111 are greater than respective upper limit temperatures at the initial power-on state of the refrigerator, both the refrigerating cycle and the freezing cycle may operate in order to reduce the temperatures of the refrigerating compartment 112 and the freezing compartment 111. For example, the freezing compartment valve 31 and the refrigerating compartment valve 32 may be turned on or opened and the freezing compartment fan 28 and the refrigerating compartment fan 29 may be rotated. In this state, the ice making fan 33 may be maintained in the stop state. If a specific condition is satisfied, the basic refrigerant cycle may operate.

First, the basic refrigerant cycle will be briefly described. At this time, for example, the case of cooling the freezing compartment 111 after cooling the refrigerating compartment 112 will be described. In order to cool the refrigerating compartment 112, the controller 50 may turn the compressor 21 on and rotate the refrigerating compartment fan 29. The controller 50 may turn on or open the refrigerating compartment valve 32 to allow refrigerant to flow to the evaporator 25 for the refrigerating compartment. The freezing compartment valve 31 and the freezing compartment fan 28 may be maintained in the off state.

The refrigerant passing through the condenser 22 after being compressed in the compressor 21 may then flow to the evaporator 25 for the refrigerating compartment through the switching valve 26. In addition, the refrigerant evaporated while flowing through the evaporator 25 for the refrigerating compartment may flow into the compressor 21 again.

Furthermore, air, which has exchanged heat with the evaporator 25 for the refrigerating compartment, may be supplied to the refrigerating compartment 112. Accordingly, the temperature of the refrigerating compartment 112 may be decreased but the temperature of the freezing compartment 111 may be increased.

During an operation of the refrigerating cycle, the controller 50 may determine whether the start condition of the freezing compartment is satisfied. In other words, the controller 50 may determine whether the stop condition of the refrigerating cycle is satisfied. For example, the controller 50 may determine that the start condition of the freezing compartment is satisfied when the temperature of the refrigerating compartment 112 is equal to or less than a first refrigerating compartment reference temperature.

Upon determining that the start condition of the freezing compartment is satisfied, the controller 50 may operate the freezing cycle. For example, the controller 50 may turn on or open the freezing compartment valve 31 such that refrigerant flows to the evaporator 24 for the freezing compartment, and may rotate the freezing compartment fan 28. In contrast, the refrigerating compartment valve 32 turned off or closed, and the refrigerating compartment fan 29 may be stopped.

Alternatively, during operation of the freezing cycle, in order to delay the rise of the temperature of the refrigerating compartment 112, when an operation of the freezing cycle starts, the refrigerating compartment fan 29 may be stopped after operating for a predetermined time, without being immediately stopped. Delay of the rise of the temperature of the refrigerating compartment 112 may mean a delay of a time required for the temperature of the refrigerating compartment 112 to reach the second refrigerating compartment reference temperature. In this case, it may be possible to reduce the temperature change width of the refrigerating compartment 112.

However, if the time required for the temperature of the refrigerating compartment 112 to reach the second refrigerating compartment reference temperature is delayed, the stop time of the freezing cycle until the start condition of the refrigerating cycle is satisfied after the freezing cycle is stopped may be increased. Alternatively, during operation of the freezing cycle, in order to delay the rise of the temperature of the refrigerating compartment 112, the refrigerating compartment fan 29 may be turned on for a predetermined time and then turned off.

During operation of the freezing cycle, the controller 50 may determine whether the stop condition of the freezing cycle is satisfied. For example, when the temperature of the freezing compartment 111 is equal to or less than the first freezing compartment reference temperature, the stop condition of the freezing cycle is satisfied. When the stop condition of the freezing cycle is satisfied, the freezing cycle may be stopped. Then, the freezing compartment fan 28 may be stopped. In addition, the compressor 21 may be stopped after pump down.

Figure 5:
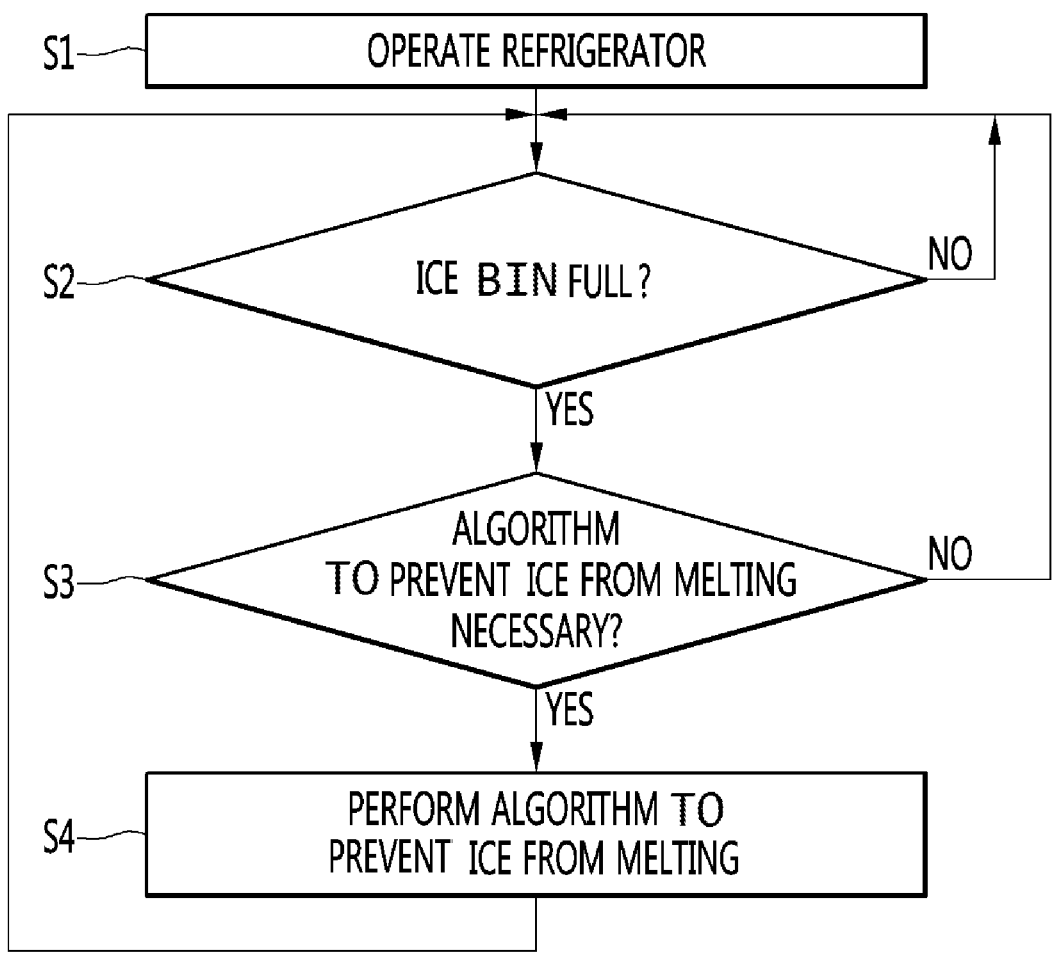
FIG. 5 is a flowchart illustrating a method of controlling a refrigerator according to an embodiment.

Referring to FIG. 5, as described above, during operation of the refrigerator, the controller 50 may determine whether the full ice state is sensed (S2), in other words, the ice bin is full of ice. Upon determining that the full ice state is sensed in step S2, the controller 50 may determine whether an ice melting prevention algorithm needs to be performed (S3).

The ice melting prevention algorithm may be performed in order to solve a problem that pieces of ice stored in the ice bin are melted and adhered to each other such that the pieces of ice may not be discharged from the ice bin. Upon determining that the ice melting prevention algorithm needs to be performed in step S3, the ice melting prevention algorithm may be performed (S4).

Figure 6:
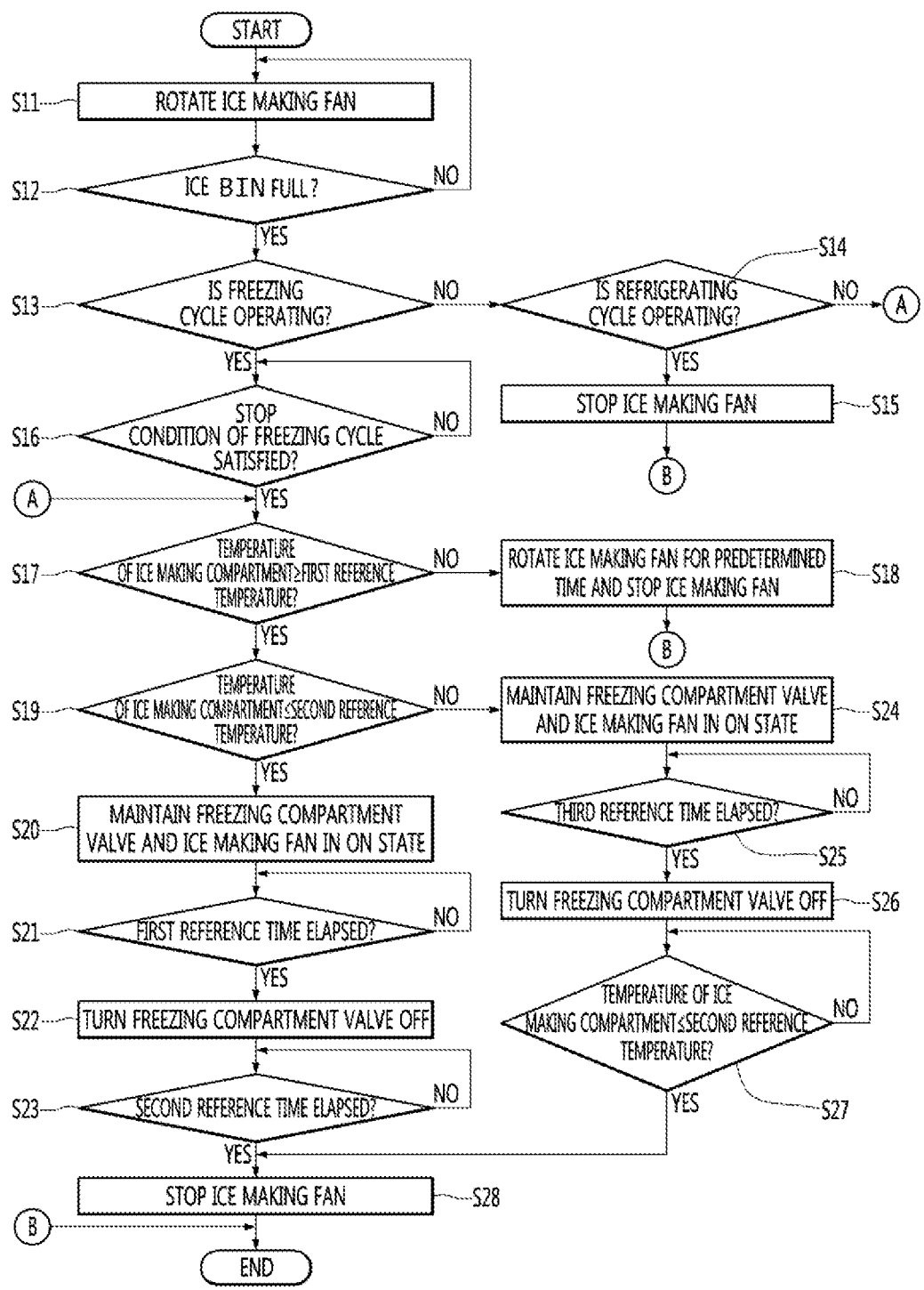
FIG. 6 is a flowchart illustrating the control method of determining whether an ice melting prevention algorithm needs to be performed.

Hereinafter, the method of determining whether the ice melting prevention algorithm needs to be performed and the algorithm itself will be described in detail. Referring to FIG. 6, before the full ice state is sensed, the ice making fan 33 may be rotated in order to supply cold air to the ice making compartment 123 (S11). The ice making fan 33 may be continuously rotated during an operation of the refrigerator 1 before the full ice state is sensed. For example, the ice making fan 33 may be rotated during pump down or in a state in which the compressor 21 is turned off.

While ice is made, the controller 50 may determine whether the full ice sensor senses the full ice state of the ice bin (S12). Upon determining that the full ice state of the ice bin is sensed in step S12, the controller 50 may check the current state of the refrigerant cycle. For example, the controller 50 may determine whether the freezing cycle is currently operating (S13).

Upon determining the freezing cycle is not operating in step S13, the controller 50 may determine whether the refrigerating cycle is currently operating (S14). Upon determining that the refrigerating cycle is currently operating in step S14, the controller 50 may stop the ice making fan 33 (S15). After the ice making fan 33 is stopped, the refrigerating cycle may be stopped and, when the freezing cycle operates, the ice making fan 33 may be rotated even while the full ice state is sensed.

In another example, if the refrigerating cycle is currently operating when the full ice state is sensed, the ice making fan 33 may be continuously rotated without being turned off in order to minimize an ice melting phenomenon. For example, when the full ice state is sensed at the beginning of the refrigerating cycle, a significant amount of time may pass before the start of the freezing cycle. Therefore, if the ice making fan 33 is immediately stopped when the full ice state is sensed, the ice may melt until the freezing cycle starts.

Accordingly, if the refrigerating cycle is currently operating when the full ice state is sensed, the ice making fan 33 may continue to rotate. Of course, after the full ice state is sensed, when the refrigerating cycle starts when the ice making fan 33 is stopped, the ice making fan 33 may remain stopped.

In another example, if the refrigerating cycle is currently operating when the full ice state is sensed, operation of the ice making fan 33 may be controlled according to the temperature of the refrigerating compartment 112. For example, if the temperature of the refrigerating compartment 112 is equal to or less than the set temperature of the refrigerating compartment when the full ice state is sensed, the ice making fan 33 may be stopped. If the temperature of the refrigerating compartment 112 is equal to or less than the set temperature of the refrigerating compartment, since a time remaining until the refrigerating cycle is stopped is small, ice may not melt even when the ice making fan 33 is stopped.

In contrast, if the temperature of the refrigerating compartment 112 is greater than the set temperature of the refrigerating compartment when the full ice state is sensed, the ice making fan 33 may be continuously rotated until the refrigerating cycle is stopped, may be stopped after a predetermined time, or may be rotated until the temperature of the refrigerating compartment 112 becomes equal to or less than the set temperature of the refrigerating compartment and then stopped. Upon determining that the refrigerating cycle is not currently operating (the pump down state or the compressor stop state) in step S14, the method progresses to step S17.

Upon determining that the freezing cycle is operating when the full ice state is sensed in step S13, the controller 50 may determine whether the stop condition of the freezing cycle is satisfied (S16). When the temperature of the freezing compartment 111 is equal to or less than the first freezing compartment reference temperature, the stop condition of the freezing cycle may be satisfied, as described above.

Upon determining that the stop condition of the freezing cycle is satisfied in step S16, the controller 50 may determine whether the temperature of the ice making compartment sensed by the ice making compartment sensor 43 is equal to or greater than a first reference temperature (S17). Step S17 may correspond to a step of determining whether the ice melting prevention algorithm needs to be performed.

Upon determining that the temperature of the ice making compartment is less than the first reference temperature in step S17, the controller 50 may rotate the ice making fan 33 for a predetermined time and stop the ice making fan 33 (S18). The controller 50 may turn off or close the freezing compartment valve 31 and the freezing compartment fan 28. For example, if the temperature of the ice making compartment is less than the first reference temperature, the temperature of the ice making compartment 123 may be kept relatively low such that the ice in the ice making compartment 123 does not melt.

In this case, in order to minimize an increase in power consumption while delaying the rise of the temperature of the ice making compartment 123, the ice making fan 33 may be rotated for a predetermined time and then stopped. In other words, pump down may be performed after the freezing cycle is stopped, and the ice making fan 33 may be rotated for a predetermined time while pump down is performed.

In contrast, upon determining that the temperature of the ice making compartment is equal to or greater than the first reference temperature in step S17, the controller 50 may perform the ice melting prevention algorithm. For example, the controller 50 may keep the freezing compartment valve 31 open and the ice making fan 33 on even when the stop condition of the freezing cycle is satisfied.

In addition, when the off condition of the freezing compartment valve 31 (i.e., when the freezing compartment valve 31 is closed) and the off condition of the ice making fan 33 are satisfied, the controller 50 may close the freezing compartment valve 31 and stop rotation of the ice making fan 33. The off condition of the freezing compartment valve 31 may be equal to or different from the off condition of the ice making fan 33. In addition, after the stop condition of the freezing cycle is satisfied, one of a plurality of off conditions of the ice making fan 33 may be selected according to the temperature of the ice making compartment 123.

For example, upon determining that the temperature of the ice making compartment 123 is equal to or greater than the first reference temperature in step S17, the controller 50 may determine whether the temperature of the ice making compartment 123 is equal to or less than a second reference temperature higher than the first reference temperature (S19). Upon determining that the temperature of the ice making compartment 123 is equal to or less than the second reference temperature in step S19, the controller 50 may keep the freezing compartment valve 31 open and may continue to rotate the ice making fan 33 even if the stop condition of the freezing cycle is satisfied (S20). At this time, the freezing compartment fan 28 may be stopped.

The controller 50 may then determine whether the stop condition of the freezing cycle is satisfied and the first reference time has elapsed (S21). Upon determining that the stop condition of the freezing cycle is satisfied and the first reference time has elapsed in step S21, the controller 50 may turn the freezing compartment valve 31 off (S22). In the present embodiment, step S21 may correspond to a step of determining whether the off condition of the freezing compartment valve 31 is satisfied.

In addition, the controller 50 may determine whether the stop condition of the freezing cycle is satisfied and the second reference time greater than the first reference time has elapsed (S23). Upon determining that the stop condition of the freezing cycle is satisfied and the second reference time has elapsed in step S23, the controller 50 may stop the ice making fan 33 (S28). In the present embodiment, step S23 may correspond to a step of determining whether the off condition of the ice making fan 33 is satisfied.

In another example, the controller 50 may determine whether the freezing compartment valve 31 is turned off and a fourth reference time has elapsed. In the present embodiment, if the temperature of the ice making compartment is equal to or greater than the first reference temperature and is equal to or less than the second reference temperature, an increase in power consumption may be minimized while decreasing the rise of the temperature of the freezing compartment 111, and the operation times of the freezing compartment valve 31 and the ice making fan 33 may be controlled to prevent the basic refrigerant cycle from being broken.

For example, before pump down, the compressor 21 may be turned on when the freezing compartment valve 31 is turned on. The longer the freezing compartment valve 31 is left open, power consumption of the compressor 21 may be increased. In addition, the longer the ice making fan 33 is rotated, power consumption may be increased.

If the off conditions of the ice making fan 33 and the freezing compartment valve 31 are determined based on the temperature of the ice making compartment 123 and a time required to decrease the temperature of the ice making compartment is increased, the start condition of the refrigerating cycle may be satisfied before pump down. In this case, the basic refrigerant cycle may be broken. Accordingly, in the present embodiment, whether the off conditions of the ice making fan 33 and the freezing compartment valve 31 are satisfied may be determined based on the operation time, not based on the temperature of the ice making compartment 123.

In contrast, upon determining that the stop condition of the freezing cycle is satisfied and the first reference time has elapsed, the controller 50 may close the freezing compartment valve 31 and stop rotation of the ice making fan 33. Upon determining that the temperature of the ice making compartment 123 is greater than the second reference temperature in step S19, the controller 50 may keep the freezing compartment valve 31 open and the ice making fan 33 rotating even if the stop condition of the freezing cycle is satisfied (S24). At this time, the freezing compartment fan 28 may be stopped. The order of step S20 and step S19 may be reversed. In this case, step 24 may be omitted.

The controller 50 may then determine whether the stop condition of the freezing cycle is satisfied and a third reference time has elapsed (S25). Upon determining that the stop condition of the freezing cycle is satisfied and the third reference time has elapsed in step S25, the controller 50 may close the freezing compartment valve 31 (S26). Step S25 may correspond to a step of determining whether the off condition of the freezing compartment valve 31 is satisfied. At this time, the third reference time may be equal to or different from the first reference time.

Next, the controller 50 may determine whether the temperature of the ice making compartment is equal to or less than the second reference temperature (S27). Upon determining that the temperature of the ice making compartment is equal to or less than the second reference temperature in step S27, the controller 50 may stop rotation of the ice making fan 33. Step S27 may correspond to a step of determining whether the off condition of the ice making fan 33 is satisfied.

If the temperature of the ice making compartment exceeds the second reference temperature, the temperature of the ice making compartment 123 may be relatively high and thus the ice in the ice making compartment 123 may melt. In addition, since it may be necessary to forcibly decrease the temperature of the ice making compartment 123, the ice making fan 33 may be continuously rotated until the temperature of the ice making compartment becomes equal to or less than the second reference temperature.

As the rotation time of the ice making fan 33 is increased, the amount of cold air supplied from the freezing compartment 111 to the ice making compartment 123 and collected in the freezing compartment 111 may be increased, thereby increasing the temperature change width (or temperature change difference) of the freezing compartment 111. However, if the temperature of the ice making compartment exceeds the second reference temperature, the action of preventing the ice in the ice bin from melting may take precedence over the action of preventing the temperature of the freezing compartment 111 from rising. Therefore, if the temperature of the ice making compartment exceeds the second reference temperature, the ice making fan 33 may be rotated until the temperature of the ice making compartment becomes equal to or less than the second reference temperature.

Whether the temperature of the ice making compartment 123 is equal to or less than the second reference temperature may not be determined before the stop condition of the freezing cycle is satisfied and the third reference time has elapsed. Since the refrigerating compartment fan may be rotated even during operation of the freezing cycle, the rise of the temperature of the refrigerating compartment may be delayed and the temperature change width (or temperature change difference) of the refrigerating compartment may be reduced, thereby improving the freshness of an object to be stored.

If the temperature change width of the refrigerating compartment is reduced, the stop period of the freezing cycle of the basic refrigerant cycle may be increased. If the stop period of the freezing cycle is increased, the on time of the freezing compartment valve may be decreased. When the compressor operates when the freezing compartment valve is turned on, the temperature of the freezing compartment may be decreased. However, if the on time of the freezing compartment valve is decreased, a time required to supply low-temperature cold air to the ice making compartment may be reduced to increase the temperature of the ice making compartment and thus the ice may melt.

Accordingly, the ice melting prevention algorithm may be performed. Even when the stop condition of the freezing cycle is satisfied, if the ice melting prevention algorithm is performed, it may be possible to reduce a phenomenon in which the ice in the ice bin melts. Therefore, it may be possible to smoothly dispense the ice.

By determining whether the off condition of the ice making fan is satisfied according to the temperature of the ice making temperature, it may be possible to minimize the rise of the temperature of the freezing compartment and to minimize increase in power consumption according to operation of the ice making fan.

The freezing compartment may be referred to as a first storage compartment and the refrigerating compartment may be referred to as a second storage compartment. The freezing cycle may be referred to as a first cooling cycle for the first storage compartment and the refrigerating cycle may be referred to as a second cooling cycle for the second storage compartment. Alternatively, the first refrigerating cycle may be referred to as a second cooling cycle and the second refrigerating cycle may be referred to as a third cooling cycle.

The freezing compartment fan may be referred to as a first cooling fan for the first storage compartment and the refrigerating compartment fan may be referred to as a second cooling fan for the second storage compartment. The ice making fan may be referred to as a third cooling fan for an ice making compartment.

Although the refrigerator in which two cooling cycles are configured using one compressor and two evaporators is described in the above embodiment, the control method for decreasing the temperature change width of the storage compartment may be applicable to a refrigerator in which two cooling cycles are configured using two compressors and two evaporators. In this case, a cold air supply unit may include fans (a refrigerating compartment fan and a freezing compartment fan) configured to blow air to compressors (a compressor for a freezing compartment and a compressor for a refrigerating compartment) and evaporators (an evaporator for a freezing compartment and an evaporator for a refrigerating compartment).

A refrigerator may include a compressor compressing a refrigerant, a first evaporator receiving the refrigerant from the compressor to generate cold air for cooling a first storage compartment, a first cooling fan for supplying the cold air into the first storage compartment, a second evaporator receiving the cold air from the compressor to generate cold air for cooling the second storage compartment, a second cooling fan for supplying the cold air into the second storage compartment, and a valve selectively opening one of a first refrigerant passage connected between the compressor and the first evaporator to allow the refrigerant to flow therebetween and a second refrigerant passage connected between the compressor and the second evaporator to allow the refrigerant to flow therebetween, and cooling of the first storage compartment and cooling of the second storage compartment may be alternately performed.

A method of controlling a refrigerator may include determining whether a full ice state of ice stored in an ice bin accommodated in an ice making compartment receiving cold air from the first storage compartment is sensed, determining, by a controller, whether an algorithm for preventing the ice stored in the ice bin from melting needs to be performed upon determining that the full ice state is sensed, and performing the algorithm when the algorithm for preventing the ice from melting needs to be performed.

A refrigerator may also include a compressor compressing a refrigerant, a first evaporator receiving the refrigerant from the compressor to generate cold air for cooling a freezing compartment, a first cooling fan for supplying the cold air into the freezing compartment, a second evaporator receiving the cold air from the compressor to generate cold air for cooling the refrigerating compartment, a second cooling fan for supplying the cold air into the refrigerating compartment, and a valve selectively opening one of a first refrigerant passage connected between the compressor and the first evaporator to allow the refrigerant to flow therebetween and a second refrigerant passage connected between the compressor and the second evaporator to allow the refrigerant to flow therebetween, and cooling of the freezing compartment and cooling of the refrigerating compartment may be alternately performed.

A method of controlling a refrigerator may include determining whether a full ice state of ice stored in an ice bin accommodated in an ice making compartment receiving cold air from the freezing compartment is sensed, determining whether a freezing cycle for the freezing compartment is operating, upon determining that the full ice state is sensed, determining whether a stop condition of the freezing cycle is satisfied, upon determining the freezing cycle is operating, determining, by a controller, whether an algorithm for preventing ice from melting needs to be performed based on a temperature of the ice making compartment, upon determining that the stop condition of the freezing cycle is satisfied, and maintaining an open state of the first refrigerant passage and rotation of a third cooling fan for the ice making compartment in order to perform the algorithm, upon determining that the algorithm needs to be performed.

A refrigerator may also include a compressor, a condenser condensing refrigerant discharged from the compressor, an evaporator for a freezing compartment and an evaporator for a refrigerating compartment branched at an outlet side of the condenser, a freezing compartment valve allowing the refrigerant to flow to the evaporator for the freezing compartment, a refrigerating compartment valve allowing the refrigerant to flow to the evaporator for the refrigerating compartment, a freezing compartment fan allowing air to flow to the evaporator for the freezing compartment, a refrigerating compartment fan allowing air to flow to the evaporator for the refrigerating compartment, an ice making fan guiding the air passing through the evaporator for the freezing compartment to an ice making compartment, an ice maker provided in the ice making compartment, an ice bin storing ice generated in the ice making compartment, an ice making compartment temperature sensor sensing a temperature of the ice making compartment, and a controller controlling the valves and the fans, The controller may operate the freezing compartment valve, the freezing compartment fan and the ice making fan upon operation of a freezing cycle, a full ice state of the ice bin is sensed during operation of the freezing cycle, and the control unit determines one or more of whether the freezing compartment valve, the refrigerating compartment fan and the ice making fan are turned off and operation times of the freezing compartment valve, the freezing compartment fan and the ice making fan, according to a temperature of the ice making compartment sensed by the ice making temperature sensor, when the freezing cycle is stopped.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a refrigerator comprising a compressor, a first evaporator, a first cooling fan, a second evaporator, a second cooling fan, a third cooling fan, and a valve, the method comprising:
   operating the third cooling fan to supply cold air to an ice bin;
   determining, by a controller, while the ice bin is being cooled by cold air received from a first storage compartment during the operating of the third cooling fan, whether the ice bin is full of ice or not;
   determining, by the controller, whether a temperature of the first storage compartment is equal to or less than a first reference temperature of the first storage compartment upon determining that the ice bin is full of ice; and
   controlling, by the controller, to both open the valve of a first refrigerant passage between the compressor and the first evaporator, and maintain the operating of the third cooling fan after determining that the temperature of the first storage compartment is equal to or less than the first reference temperature of the first storage compartment.

2. The method of claim 1, wherein the temperature of the first storage compartment is measured when a stop condition of a cooling cycle for the first storage compartment is satisfied.

3. The method of claim 2, wherein the controller operates the third cooling fan when a temperature within the ice bin is equal to or greater than a first reference temperature within the ice bin.

4. The method of claim 3, wherein upon determining that the temperature within the ice bin is less than the first reference temperature within the ice bin, the controller operates the third cooling fan for a predetermined time and stops the third cooling fan after the predetermined time.

5. The method of claim 1, wherein after a first reference time has elapsed, the controller controls the valve to close the first refrigerant passage.

6. The method of claim 5, wherein the controller turns the third cooling fan off after closing the first refrigerant passage.

7. The method of claim 6, wherein when the controller determines that a temperature within the ice bin is equal to or greater than a first reference temperature within the ice bin, the controller determines whether the temperature within the ice bin is equal to or less than a second reference temperature within the ice bin greater than the first reference temperature within the ice bin, and wherein a time point when the third cooling fan is turned off varies depending on whether the temperature within the ice bin is equal to or less than the second reference temperature within the ice bin.

8. The method of claim 7, wherein when the controller determines that the temperature within the ice bin is equal to or less than the second reference temperature within the ice bin, the controller turns the third cooling fan off when the controller determines that a second reference time greater than the first reference time has elapsed, or turns the third cooling fan off when the controller determines that a third reference time has elapsed after closing the first refrigerant passage.

9. The method of claim 7, wherein when the controller determines that the temperature within the ice bin is greater than the second reference temperature within the ice bin, the controller turns the third cooling fan off when the temperature within the ice bin is equal to or less than the second reference temperature within the ice bin.

10. The method of claim 2, wherein when the controller determines that the temperature of the first storage compartment is greater than the first reference temperature of the first storage compartment, the first refrigerant passage is closed and the third cooling fan is immediately stopped, or the first refrigerant passage is closed and the third cooling fan is stopped after operating for a predetermined time.

11. The method of claim 1, wherein the first storage compartment is a freezing compartment and the second storage compartment is a refrigerating compartment.

* * * * *